United States Patent [19]

Rose

[11] Patent Number: 4,843,565
[45] Date of Patent: Jun. 27, 1989

[54] RANGE DETERMINATION METHOD AND APPARATUS

[75] Inventor: David W. Rose, Bowie, Md.

[73] Assignee: American Electronics, Inc., Lanham, Md.

[21] Appl. No.: 79,440

[22] Filed: Jul. 30, 1987

[51] Int. Cl.$^4$ .......................... G06F 15/20; G01C 3/08
[52] U.S. Cl. ..................................... 364/513; 250/578; 356/4; 356/23; 358/107; 901/1
[58] Field of Search ............... 364/513, 559, 525, 561, 364/424.01; 250/578, 558, 552; 356/1, 3, 4, 4.5, 5, 9, 12, 23–26, 15; 358/107, 88; 354/132, 403; 901/1

[56] References Cited

U.S. PATENT DOCUMENTS

| | | | |
|---|---|---|---|
| 4,146,924 | 3/1979 | Birket et al. | 364/513 |
| 4,305,658 | 12/1981 | Yoshida | 356/23 |
| 4,499,492 | 2/1985 | Hutchin | 356/4 |
| 4,601,053 | 7/1986 | Grumet | 356/12 X |
| 4,695,959 | 9/1987 | Lees et al. | 356/3 X |

Primary Examiner—Joseph Ruggiero
Attorney, Agent, or Firm—Wegner & Bretschneider

[57] ABSTRACT

A system for determining range, particularly for robotic applications, is disclosed. The system preferably includes a single camera and at least two light sources. The lights can be turned on and off independently and are located at different distances from the target object. To determine the range, the intensity of each pixel is recorded with the front light on, then the intensity is recorded with the rear light on. The ratio of these two intensities is a unique function of range, regardless of the reflectivity of the object. If there is ambient light illuminating the object, its value must be subtracted from the intensity measurements prior to calculating the ratio.

43 Claims, 2 Drawing Sheets

"RANGE DETERMINATION METHOD AND APPARATUS"

BACKGROUND OF THE INVENTION

Modern, automated factories involve the use of "robots" in performance of required and often repetitive tasks in the manufacturing process. Such manufacturing robots need to "see" the objects they are working with in order to perform their programmed functions, sense and avoid foreign objects such as people entering their workspace, etc. Robots which are autonomous vehicles must detect and avoid path obstructions and remotely piloted vehicles are required to provide their operators with 3-D data about their surroundings.

Several systems have been suggested to perform these functions. Video parallax systems use two video cameras to record the same scene from different angles. A computer then matches points from the two pictures and calculates the range from the angle between them. However, this computer matching requires sophisticated edge detection and pattern recognition algorithms. As a result, systems based on this technique tend to be slow or very expensive.

Another method of extracting 3-D information involves the transmission of radar or ultrasonic pulses. However, these systems lack sufficient angular resolution necessary for many functions. These systems also often require mechanical aiming of either the transmit or receive transducer which reduces reliability further.

SUMMARY OF THE INVENTION

The present invention involves an apparatus capable of extraction of three-dimensional or one-dimensional range information from a single video source.

DETAILED DESCRIPTION OF THE INVENTION

A first aspect of the present invention involves an apparatus for the determination of range information comprising:

carrier means;

illumination intensity measuring means mounted on said carrier means;

a first light source mounted on said carrier means at a known distance from said illumination intensity measuring means, wherein said first light source is capable of controlled activation and inactivation;

a second light source mounted on said carrier means displaced by a predetermined baseline distance from said first light source and said illumination intensity measuring means substantially on a line along the center axis of said illumination intensity measuring means, wherein said second light source is capable of controlled activation and inactivation; and a microprocessor capable of controlling the activation and inactivation of said first and second light sources, collecting data from said illumination intensity measuring means, and manipulating said data to obtain the approximate distance between said carrier means and obstacles in the path of said carrier means.

Figure 1:
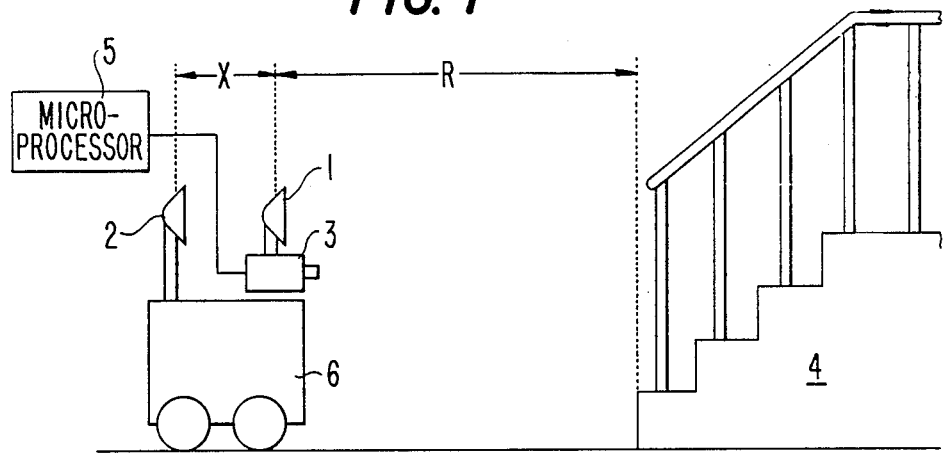
FIG. 1 depicts an embodiment of the present invention and the necessary parameters for one-dimensional and three-dimensional range determination between the apparatus and an obstacle.

As an exemplary arrangement consider the situation presented in FIG. 1. The predetermined baseline distance X separates the first light source (1) and the second light source (2). In this example, the first light source is mounted on the illumination intensity measuring means (3). The range value R represents the distance between the first light source and the obstacle (4). This distance is determined by a microprocessor (5). This distance can be corrected by a simple subtraction to adjust for the distance, if any, between the first light source and the front of the carrier means (6).

The carrier means of the present invention may be a robot arm, an autonomous vehicle, a remotely controlled vehicle, and the like.

The light sources of the present invention can be any light source capable of being controlled by a microprocessor such as tungsten bulbs. Preferable light sources are lasers, light emitting diodes (for one-dimensional applications), and light sources which emit in the infrared range.

The speed of operation of the light sources is any convenient rate up to the maximum frame rate of the illumination intensity measuring means. An about 20 Hz cycle is convenient for the strobe effect of the lights since typical television cameras operate with that range. Lights cycling at that frequency would appear almost constant to humans with a possible slight flicker.

As mentioned previously, the first and second light sources are separated by a predetermined baseline distance. This distance may either be the actual or apparent distance between the two light sources. For example, the first light source may be located a certain number of meters in front of the second light source. Also, an optical system can be designed through the use of a lens such that the first light source is located a certain number of meters from the virtual image of the rear light source.

The illumination intensity measuring means of the present invention can be any apparatus capable of measuring light intensity. Preferable illumination intensity measuring means for three-dimensional applications are video cameras. More preferable are video cameras equipped with a fast electronic shutter. Employing a fast shutter camera improves the system by decreasing the amount of ambient light entering the camera.

If the light sources are monochromatic, such as lasers, another preferred embodiment involves the use of a video camera equipped with a filter which passes only the wavelength of light emitted by the lasers. The use of such a filter serves to decrease the interference of ambient light with the range determination process. Preferable illumination intensity measuring means for one-dimensional applications are a single photodiode, a single photoresistor or a single phototransistor.

For industrial processes which will involve a high level of human contact with the robots, an infrared system can be used. That is, the first light source and second light source emit in the infrared region of the spectrum and the illumination intensity measuring means receives in the infrared region of the spectrum. This also improves accuracy of the range information by decreasing the effect of ambient light.

The microprocessor of the present invention may be constructed of conventional components. The microprocessor may optionally also be capable of other functions. Such other functions include control of the iris of the camera and control of the electronic gain of the signal. Both control of the iris and control of the electronic gain allow greater accuracy by scaling the data to increase system sensitivity to dimmer objects at the expense of clipping the signal on brighter objects. For example, a standard frame grabber is capable of resolving 256 grey levels, so a pixel brightness of 256 would be the highest valve which could be digitized. However, if the video signal gain is increased such that the pixel brightness of 227 is at the top of the digitization range, the maximum error in the P readings will be only $227/(256 \times 2)$ for a frame grabber having a resolution of 256 grey levels. Similarly, the camera iris can be set such that the brightest pixels are given a value less than but as close to 256 as possible.

Obstacles in the path of the carrier means may be obstacles to be avoided or equipment to be manipulated by the carrier means, and the like.

Figure 2:
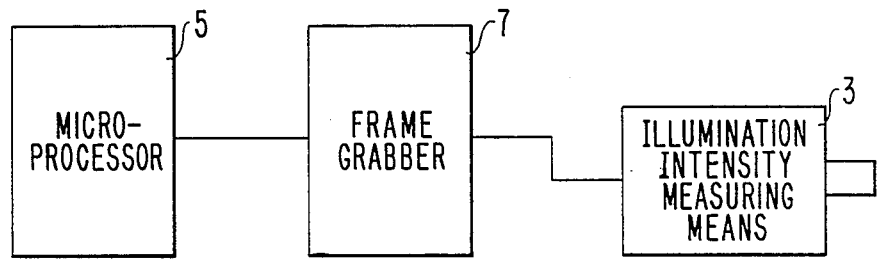
FIG. 2 depicts an embodiment of camera/microprocessor interface of the present invention.

FIG. 2 represents an exemplary camera/microprocessor interface through frame grabber (7). That is, the consecutive visual images generated by the illumination intensity measuring means are stored in the frame grabber pending analysis by the microprocessor.

Figure 3:
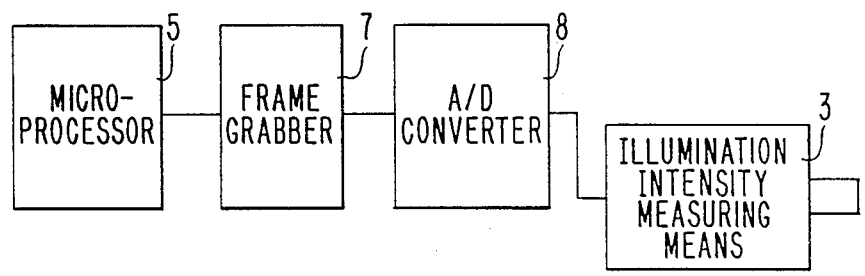
FIG. 3 depicts an alternative embodiment of the camera/microprocessor interface of the present invention.

FIG. 3 represents another exemplary camera/microprocessor interface which includes Analog/Digital converter (8). Often the A/D converter is contained within the frame grabber as shown in FIG. 2.

The functioning of this apparatus is based upon the fact that the brightness of an object varies inversely with the square of the distance from the object to the light source. As a result, the distance between the carrier and the obstacle can be determined from analysis of three consecutive frames of video data by the system microprocessor.

The first frame is taken with both the first and second controllable light sources off, using only ambient light. The second frame is taken with the anterior light on and the posterior light off. The third frame is taken with the posterior light on and the anterior light off. Anterior and posterior are defined with respect to the obstacle or target. That is, the light source closest to the obstacle or target is the anterior light.

The digitized magnitude or brightness of each pixel in each of the three frames is measured by the microprocessor. Additionally, the brightness data can be used to calculate the range information.

The brightness of each pixel can be approximated as follows:

$P_1 = k_1 E_A$ $P_2 = k_1[E_A + k_2 F/R^2]$ $P_3 = k_1[E_A + k_2 F/(R+X)^2]$ $P_1$ represents the pixel intensity with both lights off.
$P_2$ represents the pixel intensity with the front light on.
$P_3$ represents the pixel intensity with the back light on.
R represents the range from the front light to the obstacle.

$E_A$ represents the ambient illuminance.
F represents the luminous flux produced by each control light.
X represents the distance from the front light to the rear light (i.e. the baseline distance).
$k_1$ represents a constant incorporating the reflectivity of the object, efficiency of the camera optics, the camera iris setting and the electrical gain.
$k_2$ represents a constant incorporating the amount of luminous flux from the control lights directed onto the scene by the lens, etc.

If these equations are combined, rearranged and solved for R, the result is:

$$R = \frac{X}{\sqrt{\frac{P_2 - P_1}{P_3 - P_1}} - 1}$$

The above identified equations can of course be modified to incorporate correction terms for the inaccuracies of the system.

The power requirements of the system can be decreased with a concomitant accuracy increase in the range determination by taking advantage of the light storage characteristic of video cameras. In most video camera tubes, the point where the image is focused stores up electrical charge in proportion to the amount of light striking it. This charge continues to integrate until discharged by the scanning beam.

A ranging system in which the two controlled light sources are fast pulse strobe lights and the camera is "gated" using an electronic shutter or a similar device could take advantage of the light storage feature by synchronizing the strobes to fire during the vertical retrace period of the scanning beam. If the strobes are so synchronized, a resulting image will be formed at the point where the image is focused. While the instantaneous power consumed by each strobe is very high during the firing or pulse period, the average power required is low. This low average power requirement reduces the drain on the system's power supply and allows the use of light sources with higher instantaneous light output.

Additionally, it is desired for maximum accuracy that as little ambient light as possible enter the camera when measurements $P_1$, $P_2$ and $P_3$ are taken. By shuttering the camera except when the strobes are firing, a minimum amount of ambient light is allowed into the camera. For example, if the strobes are fired for a period of one microsecond and the camera is controlled such that the shutter is to be open for only that period, the amount of ambient light entering into a standard camera (with a scanning speed approximately equal to 60 times a second) can be reduced by a factor of $1:1.6 \times 10^4$.

Thus, the present invention contemplates a method of determining range information comprising:
controlling first and second light sources such that said first and second light sources are activated and inactivated independently of each other;
measuring illumination intensity under differing illumination conditions with a single illumination intensity measuring means; and
manipulating the illumination intensity measurements to obtain an approximate numerical range value.

A method of the present invention is one wherein said illumination intensity is measured under three distinct illumination conditions. Three preferred illumination conditions are (i) both the first and second light sources inactivated, (ii) the first light source activated and the second light source inactivated and (iii) the second light source activated and the first light source inactivated.

Another aspect of the present invention involves an apparatus for the determination of range information comprising:

carrier means;

illumination intensity measuring means mounted on said carrier means;

supporting means located posterior to said carrier means;

a first light source mounted on said supporting means, wherein said first light source is capable of controlled activation and inactivation;

a second light source mounted on said supporting means at a predetermined baseline distance from said first light source substantially along the center axis of said illumination intensity measuring means, wherein said second light source is capable of controlled activation and inactivation; and a microprocessor capable of controlling the activation and inactivation of said first and second light sources, collecting data from said illumination intensity measuring means, and manipulating said data to obtain the approximate distance between said carrier means and obstacles in the path of said carrier means.

Figure 4:
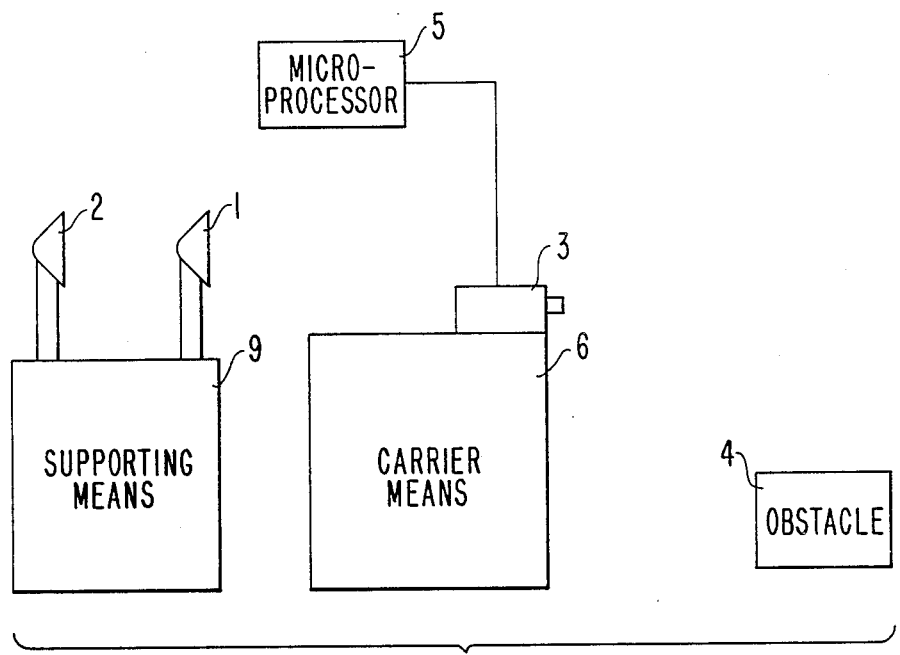
FIG. 4 depicts another embodiment of the present invention useful for more stationary applications.

As an exemplary arrangement consider the apparatus pictured in FIG. 4. In this embodiment, the light sources (1) and (2) are mounted on a supporting means (9) while the illumination intensity measuring means (3) is mounted on a carrier means (5).

The supporting means of the present invention can be any fixed surface upon which the light sources can be mounted. Counter tops, other pieces of equipment or even the ceiling are contemplated.

As before, the parameter R is the distance between the first light source and the obstacle. However, a simple subtraction operation of the distance between the front of the apparatus such as a robot arm and the first light source provides the approximate distance between the carrier means and the obstacle or target. For example, the known distance between the anterior end of a fully extended robot arm and the first light source would be subtracted from the determined R value to give the desired distance value.

Similarly, an apparatus for the determination of range information comprising:

carrier means;

supporting means located posterior to said carrier means;

illumination intensity measuring means mounted on said supporting means;

a first light source mounted on said supporting means, wherein said first light source is capable of controlled activation and inactivation;

a second light source mounted on said supporting means at a predetermined baseline distance from said first light source substantially along the center axis of said illumination intensity measuring means, wherein said second light source is capable of controlled activation and inactivation; and a microprocessor capable of controlling the activation and inactivation of said first and second light sources, collecting data from said illumination intensity measuring means, and manipulating said data to obtain the approximate distance between said carrier means and obstacles in the path of said carrier means is contemplated.

An exemplary arrangement is a modification of the apparatus pictured in FIG. 4. In this embodiment, the illumination intensity measuring means (3) is also mounted on supporting means (9).

As before, the parameter R is the distance between the first light source and the obstacle. However, a simple subtraction operation of the distance between the front of the apparatus such as a robot arm and the first light source provides the approximate distance between the carrier means and the obstacle or target. For example, the known distance between the anterior end of a fully extended robot arm and the first light source would be subtracted from the determined R value to give the desired distance value.

Additionally, an apparatus for the determination of range information comprising:

carrier means;

supporting means located posterior to said carrier means;

illumination intensity measuring means mounted on said supporting means;

a first light source mounted on said carrier means, wherein said first light source is capable of controlled activation and inactivation;

a second light source mounted on said carrier means at a predetermined baseline distance from said first light source substantially along the center axis of said illumination intensity measuring means, wherein said second light source is capable of controlled activation and inactivation; and a microprocessor capable of controlling the activation and inactivation of said first and second light sources, collecting data from said illumination intensity measuring means, and manipulating said data to obtain the approximate distance between said carrier means and obstacles in the path of said carrier means is contemplated.

Figure 5:
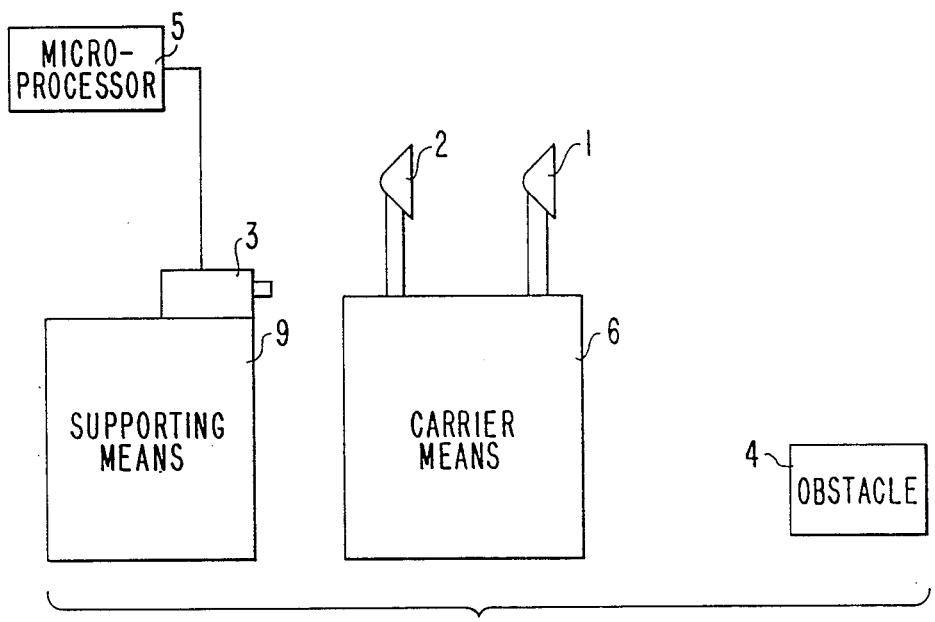
FIG. 5 depicts another preferred embodiment of the present invention.

An exemplary arrangement shown in FIG. 5 is a modification of the apparatus pictured in FIG. 4. In this embodiment, the illumination intensity measuring means (3) is mounted on supporting means (9) while the first light source (1) and second light source (2) are mounted on carrier means (6). In this arrangement, the range information is calculated as in the first aspect of the invention described above.

Other configurations of the apparatus with respect to the relative positions and location (with respect to mobility of the support) of the first and second light sources and illumination intensity measuring means are within the spirit and scope of the present invention.

What is claimed is:

1. An apparatus for the determination of range information comprising:

carrier means;

illumination intensity measuring means mounted on said carrier means;

a first light source mounted on said carrier means at a known distance from said illumination intensity measuring means, wherein said first light source is capable of controlled activation and inactivation;

a second light source mounted on said carrier means displaced by a predetermined baseline distance from said first light source and said illumination intensity measuring means substantially on a line along the center axis of said illumination intensity measuring means, wherein said second light source is capable of controlled activation and inactivation; and a microprocessor capable of controlling the activation and inactivation of said first and second light sources, collecting data from said illumination intensity measuring means, and manipulating said data to obtain the approximate distance between said carrier means and obstacles in the path of said carrier means.

2. An apparatus of claim 1 capable of determination of three-dimensional range information, wherein said illumination intensity measuring device is a video camera.

3. An apparatus of claim 2, wherein said first and second light sources are lasers.

4. An apparatus of claim 3, wherein said video camera is equipped with a filter which passes only the wavelength of light emitted by the lasers.

5. An apparatus of claim 1, wherein said apparatus operates in the infrared spectrum.

6. An apparatus of claim 2, wherein said microprocessor controls the iris of the camera.

7. An apparatus of claim 2, wherein said microprocessor controls the electronic gain of the video signal.

8. An apparatus of claim 1 capable of determination of one-dimensional range information, wherein said illumination intensity measuring device is a single photodiode.

9. An apparatus of claim 1 capable of determination of one-dimensional range information, wherein said illumination intensity measuring device is a single photoresistor.

10. An apparatus of claim 1 capable of determination of one-dimensional range information, wherein said illumination intensity measuring device is a phototransistor.

11. An apparatus of claim 8, wherein said first and second light sources are light emitting diodes.

12. An apparatus of claim 9, wherein said first and second light sources are light emitting diodes.

13. An apparatus of claim 10, wherein said first and second light sources are light emitting diodes.

14. An apparatus for the determination of range information comprising:
carrier means;
illumination intensity measuring means mounted on said carrier means;
supporting means located posterior to said carrier means;
a first light source mounted on said supporting means, wherein said first light source is capable of controlled activation and inactivation;
a second light source mounted on said supporting means at a predetermined baseline distance from said first light source substantially along the center axis of said illumination intensity measuring means, wherein said second light source is capable of controlled activation and inactivation; and
a microprocessor capable of controlling the activation and inactivation of said first and second light sources, collecting data from said illumination intensity measuring means, and manipulating said data to obtain the approximate distance between said carrier means and obstacles in the path of said carrier means.

15. An apparatus of claim 14 capable of determination of three-dimensional range information, wherein said illumination intensity measuring device is a video camera.

16. An apparatus of claim 15, wherein said first and second light sources are lasers.

17. An apparatus of claim 14 capable of determination of one-dimensional range information, wherein said illumination intensity measuring device is a single photodiode.

18. An apparatus of claim 14 capable of determination of one-dimensional range information, wherein said illumination intensity measuring device is a single photoresistor.

19. An apparatus of claim 14 capable of determination of one-dimensional range information, wherein said illumination intensity measuring device is a phototransistor.

20. An apparatus of claim 17, wherein said first and second light sources are light emitting diodes.

21. An apparatus of claim 18, wherein said first and second light sources are light emitting diodes.

22. An apparatus of claim 19, wherein said first and second light sources are light emitting diodes.

23. An apparatus for the determination of range information comprising:
carrier means;
supporting means located posterior to said carrier means;
illumination intensity measuring means mounted on said supporting means;
a first light source mounted on said supporting means, wherein said first light source is capable of controlled activation and inactivation;
a second light source mounted on said supporting means at a predetermined baseline distance from said first light source substantially along the center axis of said illumination intensity measuring means, wherein said second light source is capable of controlled activation and inactivation; and
a microprocessor capable of controlling the activation and inactivation of said first and second light sources, collecting data from said illumination intensity measuring means, and manipulating said data to obtain the approximate distance between said carrier means and obstacles in the path of said carrier means.

24. An apparatus of claim 23 capable of determination of three-dimensional range information, wherein said illumination intensity measuring device is a video camera.

25. An apparatus of claim 24, wherein said first and second light sources are lasers.

26. An apparatus of claim 23 capable of determination of one-dimensional range information, wherein said illumination intensity measuring device is a single photodiode.

27. An apparatus of claim 23 capable of determination of one-dimensional range information, wherein said illumination intensity measuring device is a single photoresistor.

28. An apparatus of claim 23 capable of determination of one-dimensional range information, wherein said illumination intensity measuring device is a phototransistor.

29. An apparatus of claim 26, wherein said first and second light sources are light emitting diodes.

30. An apparatus of claim 27, wherein said first and second light sources are light emitting diodes.

31. An apparatus of claim 28, wherein said first and second light sources are light emitting diodes.

32. An apparatus for the determination of range information comprising:
  carrier means;
  supporting means located posterior to said carrier means;
  illumination intensity measuring means mounted on said supporting means;
  a first light source mounted on said carrier means, wherein said first light source is capable of controlled activation and inactivation;
  a second light source mounted on said carrier means at a predetermined baseline distance from said first light source substantially along the center axis of said illumination intensity measuring means, wherein said second light source is capable of controlled activation and inactivation; and
  a microprocessor capable of controlling the activation and inactivation of said first and second light sources, collecting data from said illumination intensity measuring means, and manipulating said data to obtain the approximate distance between said carrier means and obstacles in the path of said carrier means.

33. An apparatus of claim 33 capable of determination of three-dimensional range information, wherein said illumination intensity measuring device is a video camera.

34. An apparatus of claim 34, wherein said first and second light sources are lasers.

35. An apparatus of claim 33 capable of determination of one-dimensional range information, wherein said illumination intensity measuring device is a single photodiode.

36. An apparatus of claim 33 capable of determination of one-dimensional range information, wherein said illumination intensity measuring device is a single photoresistor.

37. An apparatus of claim 33 capable of determination of one-dimensional range information, wherein said illumination intensity measuring device is a phototransistor.

38. An apparatus of claim 36, wherein said first and second light sources are light emitting diodes.

39. An apparatus of claim 37, wherein said first and second light sources are light emitting diodes.

40. An apparatus of claim 38, wherein said first and second light sources are light emitting diodes.

41. A method of determining range information to an object comprising:
  controlling first and second light sources, said first light source being located anteriorly of said second light source with respect to the object, and said first and second light sources being activated and deactivated independently of each other;
  measuring illumination intensity of the object under differing illumination conditions with a single illumination intensity measuring means; and
  manipulating the illumination intensity measurements to obtain an approximate range value, said approximate range value being a function of the ratio of said illumination intensity measurement taken when said first light source is activated to said illumination intensity measurement taken when said second light source is activated.

42. A method of claim 42, wherein said illumination intensity is measured under three distinct illumination conditions.

43. A method of claim 43, wherein the illumination intensity is measured with both the first and second light sources inactivated, with the first light source activated and the second light source inactivated and with the second light source activated and the first light source inactivated.

* * * * *